United States Patent [19]
Ellies et al.

[11] 3,748,778
[45] July 31, 1973

[54] INTERLOCKABLE STICKS FOR CONFECTIONS
[76] Inventors: Alan David Ellies; Richard E. Cone, 2nd, both of 1327 W. King Ave., Columbus, Ohio 43212
[22] Filed: Sept. 27, 1972
[21] Appl. No.: 292,817

[52] U.S. Cl. .................................. 46/28, 52/667
[51] Int. Cl. .......................... 99 138 S, A63h 33/08
[58] Field of Search ........................... 46/28, 20, 27; 99/138 S, 137; D34/15 GG; 287/20.92 Y, 20.92 D; 52/667, 233, 666, 668

[56] References Cited
UNITED STATES PATENTS
3,663,717   5/1972   Coster .......................... 99/138 S R
2,844,910   7/1958   Korchak ................................ 46/28
1,402,438   1/1922   Nichols ................................. 46/20
2,110,990   3/1938   Forbes .............................. 46/28 X Primary Examiner—Tim R. Miles
Assistant Examiner—Steven L. Weinstein
Attorney—George A. Kap, et al.

[57] ABSTRACT

A rectangular stick of a substantially uniform thickness for mounting a frozen comestible comprising apertures disposed in spaced relationship along the stick, each aperture including a circle and a pair of diametrically opposed notches disposed along the axis of the stick; a pair of transverse notches between apertures having a depth equal to the thickness of the stick and a longitudinal dimension equal to the width of the stick; and a pair of transverse slots disposed between apertures and centered within the pair of transverse notches having a longitudinal dimension equal to the thickness of the bar.

7 Claims, 4 Drawing Figures

PATENTED JUL 31 1973   3,748,778
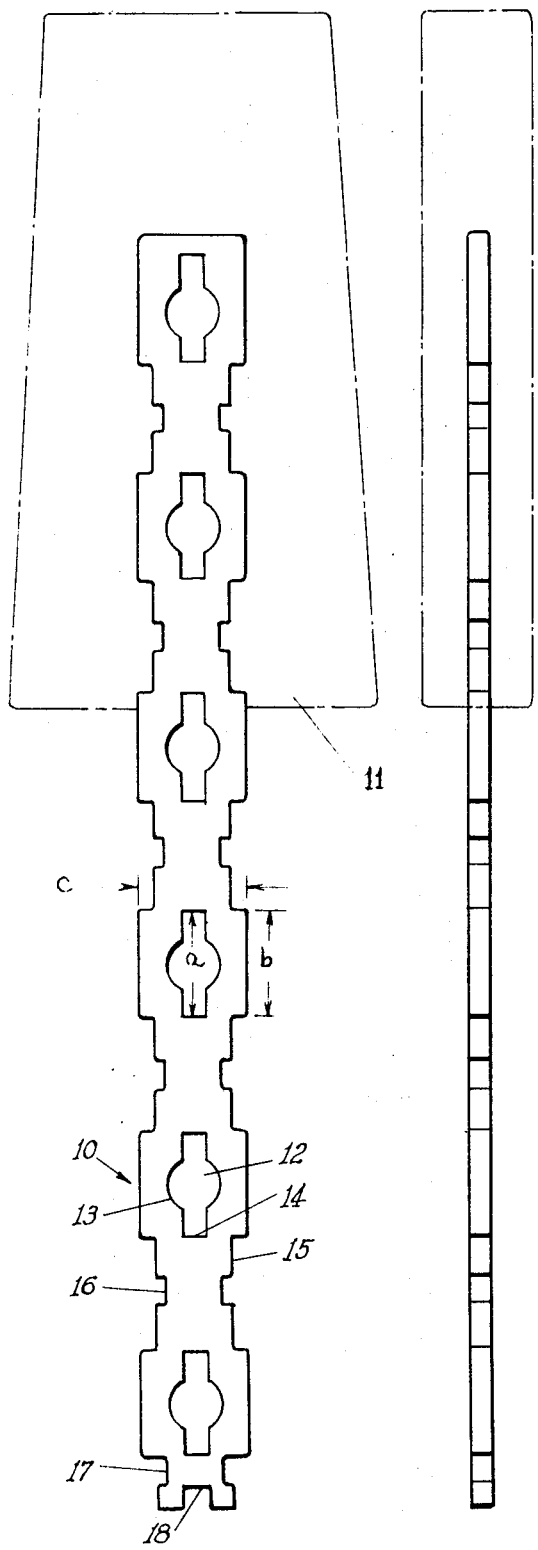
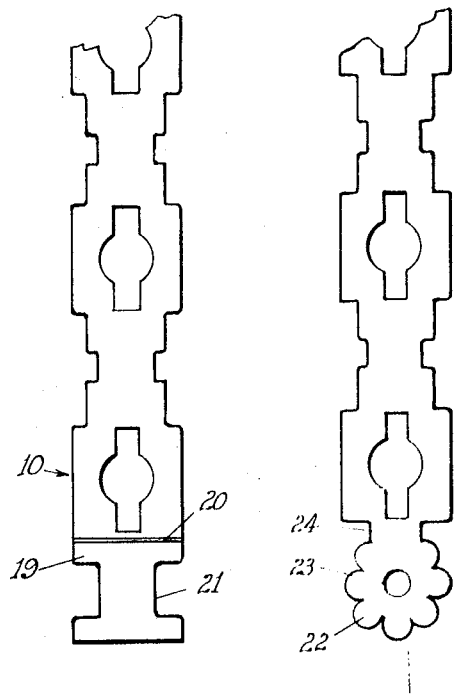
Fig 1    Fig 2    Fig 3    Fig 4

INTERLOCKABLE STICKS FOR CONFECTIONS

The age of wooden frozen confection sticks is coming to an end. The material which is replacing wood is plastic. Plastic is not only more efficient in supporting a frozen confection but is also more decorative and more suitable for fabrication in various designs which permit the stick to be used as a toy after the frozen comestible is consumed.

An example of a plastic confection stick presently on the market is Elsie Stix, which is described and claimed in U. S. Pat. No. 3,663,717 issued on May 16, 1972. Elsie Stix is a registered trademark of Borden, Inc. The use of Elsie Stix as frozen confection sticks is an unqualified commercial success and attests to the popularity of items which have an after-use as toys. As reported in New York Times of May 28, 1972. Borden expects to use some 500 million of Elsie Stix in 1972. Traditional annual market of the wooden ice cream sticks runs to about 7 billion.

The prior art of frozen confections has suggested that the use of sticks as toys by interconnecting the sticks in various possible ways in order to construct a toy structure. For example, notches have been provided on the edges of the sticks so that they could be interconnected to form such toy constructions as log cabins, derricks, furniture and the like. Nevertheless, none of the uses suggested have contemplated the construction of a structure having a lasting character, i.e., the joints formed by the notched confection bars have not lent themselves to any kind of rigid enduring construction. While the known notched confection bars have the advantage of quick disassembly, nonetheless, any vibration of the base or surface on which the structure rests will normally result in total collapse of same. Consequently, the notched confection bars heretofore made available to the public have not been favorably received. If a confection bar could be developed which permits a releasable yet rigid interconnection with other bars so that a lasting structure can be erected, it is believed that the market for frozen confections would be greatly enhanced.

Although the frozen confection stick described in U.S. Pat. No. 3,663,717 permits construction of structures which have substantially rigid joints and therefore, can be used to erect a lasting structure, a confection stick is described and claimed herein which is more versatile and thus allows for more variations in the type of connections that can be made between the sticks.

The present invention relates to a frozen confection stick and to a combination of the stick with a comestible, such as a frozen confection in the form of ice cream, flavored ice and the like. The sticks of the present invention provide for interlockable joints in order to form rigid structures which may be readily disassembled by the user. The sticks can also be sold individually in quantities without initially serving as handles for a confection.

Briefly stated, the present invention relates to an elongated, reactangular stick having a substantially uniform thickness which may be used to mount a frozen confection. The stick has at least one aperture, a pair of transverse notches and a pair of transverse slots in the transverse notches. The aperture includes a circle and a pair of diametrically opposed notches disposed along the longitudinal axis of the stick and having a width equal to the thickness of the stick. The longitudinal dimension between the diametrical notches equals the width of the stick. The transverse notches are rectangular and are provided between apertures on both edges of the stick. The depth of the transverse notches is equivalent to the thickness of the stick and these notches serve the purpose of lodging a stick in crosswise fashion. Disposed centrally in the transverse notches are rectangular slots whose width equals the thickness of the stick and whose depth is about one eighth of an inch. The dimension between the slots across the stick equals the diameter of the circle in the aperture whereas the dimension between the transverse notches on opposing edges of the stick is greater than the diameter of the circle in the aperture but of course, smaller than the width of the stick.

The sticks can be interconnected by sliding one stick through the aperture of another with the width of the stick disposed along the longitudinal axis of the first stick. The width of the first stick will pass through the diametrical notches in the aperture of the other stick and can be manipulated to provide a connection whereby the sticks are oriented with the width of one disposed along the longitudinal axis of the other or else, the first stick can be pushed through further until the slots are in alignment with the thickness dimension of the stick. Since extent between opposing slots equals the diameter of the circle in the aperture, the sticks can be rotated relative to each other to the desired position. In addition to the interconnection described above, one stick can be wedged in the slot of another or be disposed in one of the transverse notches.

The ends of the sticks are provided with reduced extensions which have a pair of transverse terminal notches and an end notch. These notches have a width equal to the thickness of the stick and serve the purpose for wedging other sticks.

In another embodiment, a terminal portion is provided at one or both ends of the stick which is of the same width as the stick and which is detachably attached to the stick by means of a score line or a weakened section. This terminal portion has a pair of double transverse notches whose width is twice the thickness of a stick. This terminal section can be broken-off and used where it is desried to hold a pair of sticks together.

In still another embodiment, a decorative terminal section is provided at one or both ends of the stick the width and thickness of which corresponds to that of the stick. Between the terminal section and the stick, there is an intermediate section which equals in width to the diameter of the circle in the aperture. With this arrangement, it is possible to effect a connection between a pair of sticks by passing the terminal section through the aperture until the aperture is over the intermediate section. The width of the intermediate section is such that the sticks can be rotated to the desired position.

The various features of this invention will become apparent from the following detailed description set forth in connection with the accompanying drawing which relates to the preferred embodiment of the present invention and is given by way of illustration.

FIG. 1 is a front view of the preferred embodiment of a stick and a comestible mounted thereon.

FIG. 2 is a side view of the preferred embodiment of the invention.

FIG. 3 is an alternate embodiment where a detachable terminal section is provided.

FIG. 4 is another embodiment illustrating a different decorative terminal section.

Referring now to the preferred embodiment illustrated in FIG. 1, there is set forth a confection stick 10 on which is conventionally mounted a frozed ice cream or flavored ice 11 so that the lower portion of the stick extending therefrom serves as a handle which the user grasps as he eats the confection. The stick 10 is preferably formed of a resilient plastic material, but other materials may be used. It includes a plurality of spaced apertures 12 each of which includes a circular portion 13, the axis of which, in the preferred embodiment, projects at right angles to the longitudinal center line of the stick. The apertures 12 also include on either side projecting outwardly from the circle along the longitudinal center of the stick a pair of diametrically opposed notches 14. It should be appreciated that the apertures 12 receive the confection therein in its frozen state and insure that no relative movement of the confection is permitted, regardless of the low coefficient of friction which plastic materials generally possess.

Intermediate each of the spaced apertures 12 are a pair of inwardly projecting transversely aligned notches 15 of equal width. In order to maximize the use of the limited working area on the stick 10 in the preferred embodiment, each of the inwardly projecting edges of notches 15 lie in the same plane as the outer edge of the diametrically opposed notches 14 of each of the spaced apertures.

Notches 15 are generally rectangular and have a depth equal to the thickness of the stick and a length equal to the width of the stick. Notches 15 provide space for the stick to be laid across. The distance across the stick between a pair of opposing notches 15 is greater than diameter of circle 13 but, of course, less than the width of the stick.

Stick 10 also includes transverse slots 16 of generally rectangular shape disposed centrally in notches 15 on both edges of the stick. The width of the slots 16 is equal to the thickness of the sticks and the depth is about one eighth of an inch but can vary, as desired. The distance across the stick from one slot to the slot on the opposite side equals to the diameter of the circle in aperture 12 and this allows relative rotation of a pair of sticks when one is disposed within the aperture of the other.

The sticks of preferred embodiment have dimensions a, b and c shown in FIG. 1, which are equal. It is this relationship of parts which permits formation of T-beams and H-beams, as well as many other forms and shapes. It should be understood that dimension a and c must be about equal to enable one to push one stick through an aperture of another, however, dimension c can be larger although this would mean that one would forego many configurations possible with sticks where dimensions a, b and c are equal.

The ends of the sticks have a reduced terminal section containing transverse terminal notches 17 and an end notch 18. These notches are rectangular having a width equal to the thickness of a stick. As should be apparent, a stick can be wedged in each one of these notches.

FIG. 3 illustrates an alternate embodiment where a terminal section 19 is secured to stick 10 by means of a frangible connection 20, which can be a weakened section or a score line. Section 19 has a pair of double notches 21 which can accomodate a pair of sticks because its width is twice the thickness of a stick. Sections 19 can be detached and used wherever a specific construction may require.

A decorative section 22 is attached to the stick in the illustrated embodiment of FIG. 4. Section 22 can be a daisy as shown, or any other embelishment or a company logo. It is of the same width as the stick and can therefore pass through an aperture. An opening 23 is centrally provided in section 22 for any purpose which it may serve. Section 22 is attached to stick 10 by an intermediate section 24 having a width equal to the diameter of the circle in aperture 12 which means that a pair of sticks can be unterconnected through section 24 and rotated relative to each other.

With the type of stick described above, it is desired to effect a right angle interlocking joint between a pair of confection sticks which is substantially absent of any relative movement or play. Accordingly, it should be apparent that the dimensions of the apertures and notches are critical in order to matingly receive the complementary notches and apertures of a second stick. In the preferred embodiment, the width of the transverse slots 16 are substantially equal to the width of the diametrically opposed notches 14 and in turn, approximately equal to the thickness of the stick 10. The diameter of the circular portion 13 is equal to or slightly greater than the dimension between the inner edges of the transversely aligned slots 16. Moreover, the dimension between the outer edges of the diametrically opposed notches 14 should be equal to or slightly greater than the width of stick 10. As is well-known in the coupling and joint art, various tolerances and allowances may be made to the dimension of the mating elements to insure a force fit of these elements to form a rigid joint. It should be understood that wherever it is stated that a certain dimension is equal to another dimension, it is meant that the tolerances are such as to affect a relatively rigid interconnection.

In operation, once the frozen confection has been consumed by the user and a number of sticks 10 have been collected, a rigid construction unit may be formed by positioning one stick at right angles to a second stick and inserting the width and thickness of the first into the aperture 12 of the second through the diametrically opposed notches 14 until one of the pairs of transversely aligned slots on the second stick is aligned or meshes with the thickness of the first stick. The first stick may then be rotated in the circular portion 13 of the second stick to form a rigid interlocking joint between the two. It should thus be apparent that by utilizing this interlocking joint, a substantial number of sticks may be interconnected to form a rigid structure. Alternatively, the transverse slots 16 of several sticks may be interconnected with others to form a wall or other like structure.

Additional connections can be made with the sticks by utilizing the notches in the terminal sections thereof in the sticks illustrated in FIGS. 1 and 3, and the intermediate section of the stick shown in FIG. 4.

It should be obvious to any collector of these sticks that with only the slightest degree of ingenuity, a spate of designs of rigid structures may be readily assembled and thereafter disassembled.

Although three embodiments of the present invention have been herein illustrated and described, it will be evident to those skilled in the art that various modifications may be incorporated into the details of construction without departing from the principles herein set forth.

What is claimed is:

1. An elongated rectangular stick comprising at least two apertures including a circular outline having a pair of diametrically opposed rectangular notches, said notches having a width equal to the thickness of said stick and the dimension between extremities of a pair of said diametrical notches being equal to the width of said stick; rectangular transverse notches between said apertures disposed on both edges of said stick having a length equal to the width of said stick, the distance across said stick between a transverse notch on one edge and a directly opposed transverse notch on the other edge being less than the width of said stick but greater than the diameter of the circular outline; and rectangular slots disposed in said transverse notches having a width equal to at least one thickness of said stick, the distance across said stick between a pair of slots being equal to the diameter of the circular outline.

2. Stick of claim 1 having a substantially uniform thickness, said diametrical notches are disposed on the axis of said stick and the width of said slots is equal to the thickness of said stick.

3. Stick of claim 2 wherein said transverse notches are arranged in opposing pairs on the edges of said stick and said slots are centrally disposed in said transverse notches and are also arranged in opposing pairs on the edges of said stick;

4. Stick of claim 3 wherein the distance between successive notches on an edge of a stick and the distance between diametrically opposed notches in an aperture are both equal to the width of said stick.

5. Stick of claim 4 including a terminal portion on at least one end of said stick having a pair of transverse notches and one end notch of sufficient width to accomodate a stick.

6. Stick of claim 4 including a terminal section detachably secured to said stick and having a pair of opposing transverse notches.

7. Stick of claim 4 having a terminal decorative section attached to said stick which includes a reduced intermediate region of a width equal to the diameter of the circular outline.

* * * * *